US009595297B2

(12) United States Patent
Mertens

(10) Patent No.: US 9,595,297 B2
(45) Date of Patent: Mar. 14, 2017

(54) APPARATUSES AND METHODS FOR DEFINING COLOR REGIMES

(75) Inventor: Mark Jozef Willem Mertens, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 205 days.

(21) Appl. No.: 13/577,930

(22) PCT Filed: Feb. 24, 2011

(86) PCT No.: PCT/IB2011/050767
§ 371 (c)(1),
(2), (4) Date: Aug. 9, 2012

(87) PCT Pub. No.: WO2011/107905
PCT Pub. Date: Sep. 9, 2011

(65) Prior Publication Data
US 2012/0314129 A1     Dec. 13, 2012

(30) Foreign Application Priority Data

Mar. 3, 2010    (EP) .................................... 10155277

(51) Int. Cl.
*G11B 27/11* (2006.01)
*H04N 1/00* (2006.01)
(Continued)

(52) U.S. Cl.
CPC ......... *G11B 27/11* (2013.01); *H04N 1/00392* (2013.01); *H04N 1/00424* (2013.01);
(Continued)

(58) Field of Classification Search
CPC ............... G11B 27/11; H04N 1/00392; H04N 1/00424; H04N 1/00448; H04N 2201/3259;
(Continued)

(56) References Cited

U.S. PATENT DOCUMENTS 5,420,638 A     5/1995  Riglet et al.
5,717,838 A *   2/1998  LeClair .................... 358/1.9
(Continued)

FOREIGN PATENT DOCUMENTS

EP    1845704 A2   10/2007
JP    H0662385 A    3/1994
(Continued)

OTHER PUBLICATIONS

Anonymous: Autodesk Lustre 2010 User Guide, Version 1; Autodesk Inc., Oct. 2009, Retrieved from the Internet: htttp://download.autodesk.com/us/systemdocs/pdf/lustre2010_user_guide.pdf, retrieved on Jun. 10, 2011, 818 pages.

*Primary Examiner* — Dave Czekaj
*Assistant Examiner* — Berteau Joisil

(57) ABSTRACT

To allow a better coordination between an image creation artist such as a movie director of photography and the final viewer (via the display and its built-in image processing), we describe method of adding image defining information to an input image signal (I), comprising: —showing the input image (I) to a human operator; receiving via a user interface (303, 308) descriptive data (D) from the human operator, the descriptive data (D) including at least luminance values and/or geometrical shape information on the one hand, and a regime descriptor (rd) on the other hand; encoding into an output description data signal (DDO), relatable to an output image signal (O) based upon the input image signal (I), of the descriptive data (D) in a technical format standardized to be intended for use by a receiving display to control its image processing for changing the color properties of its rendered images.

12 Claims, 7 Drawing Sheets

(51) Int. Cl.
 *H04N 5/85* (2006.01)
 *H04N 9/793* (2006.01)

(52) U.S. Cl.
 CPC .......... *H04N 1/00448* (2013.01); *H04N 5/85* (2013.01); *H04N 9/793* (2013.01); *H04N 2201/3259* (2013.01)

(58) Field of Classification Search
 CPC  H04N 1/62; H04N 5/85; H04N 9/793; H04N 1/603
 USPC ........................................................ 348/474
 See application file for complete search history.

(56) References Cited

U.S. PATENT DOCUMENTS

| | | | |
|---|---|---|---|
| 2001/0004739 A1* | 6/2001 | Sekiguchi et al. ............ | 707/100 |
| 2005/0073527 A1* | 4/2005 | Beardow ....................... | 345/582 |
| 2005/0117798 A1 | 6/2005 | Patton et al. | |
| 2007/0061023 A1* | 3/2007 | Hoffberg et al. ............... | 700/83 |
| 2007/0268411 A1 | 11/2007 | Rehm et al. | |

FOREIGN PATENT DOCUMENTS

| | | |
|---|---|---|
| JP | 2003216970 A | 1/2002 |
| JP | 2008515349 A | 5/2008 |
| JP | 2008259161 A | 10/2008 |
| WO | 2007023425 A2 | 3/2007 |
| WO | 2007097803 A1 | 8/2007 |
| WO | 2007113754 A1 | 10/2007 |
| WO | 2009095732 A1 | 8/2009 |

* cited by examiner

APPARATUSES AND METHODS FOR DEFINING COLOR REGIMES

FIELD OF THE INVENTION

The invention relates to a method of adding image defining information to an input image signal, an image analysis apparatus for adding image defining information to image pixel information of an input image signal, and similarly corresponding to what this method and apparatus do at the image production side, a method of processing an input image signal to be rendered based on image defining information related to the input image signal, an apparatus for processing an input image signal to be rendered based on image defining information related to the input image signal, and for coordinating the desired rendering on the image production side and the actual rendering on the display side, an image signal comprising color regime descriptions, which will typically be standardized, e.g. in an MPEG standardization.

BACKGROUND OF THE INVENTION

In the early days of color rendering, e.g. for television program display, the relationship between the content creation side (e.g. the camera operator), and the color rendering side (e.g. display on a television or computer display) was simple, and fixed by rigid technical principles. A so called standard CRT display was defined, which had particular phosphors, a certain gamma 2.2 tone reproduction curves, with 256 approximately visually equidistant driving steps etc. There are a number of fundamental color reproduction questions which were in this manner addressed, i.a. should a color rendering system be optimized to the (best) human viewer, and more importantly, should the color rendering capabilities (and in particular the color description/communication standard) be prescribed/determined (mostly) by the color capturing (camera) side or the color rendering (display) side. A number of approximations were introduced at the time, as the ground rules for television colorimetry for the decades to come. Taking the physical display constraints of the era of the first color television into account, the first displays and displayed signals were optimized so that they would yield an ideal picture to the viewer, given the size, brightness etc. of the CRTs available at that time (NTSC, the late 1940s early 1950s: resolution fine enough for typical viewing distance, enough driving steps to just noticeable difference [JND] perceptually reach good, indiscriminable black starting from the white luminances at the time, etc.). Then, given that standard display of that time, which was a small, dark CRT, the rules for the content production side were laid down for converting captured scenes in reasonably looking pictures on the display, for most scenes (similar considerations took place in the world of analog photography, in which a scene had to be rendered in an often low quality photo print, which never had a contrast above 100:1, imperfect colors, etc.). E.g., even though theoretically one would need a spectral camera to measure a real life color scene (given its variable illumination), as an approximation, if one knows on which device the color is to be displayed on, camera sensitivity curves can be determined. Images captured with such camera sensitivity curves are then supposed to reconstruct a similarly looking picture on the display, at least emulating at the same time the illumination of the scene at the capturing side, but in practice there will be errors. Furthermore, these camera curves will have negative lobes, and although one could try to reproduce these theoretical optimal curves exactly with optical filter combinations, in practice (also given that the viewer does not know which colors exactly occur in the scene) matrixing will suffice to make the colors look reasonable. Several content creation side professionals like the camera operator and a color grader/corrector have to do their magic with parametric transformations to make the finally encoded images look optimal when displayed. E.g., what is usually done by a color corrector [in the video world where different video feeds are combined] is that they look at the white points of the different inputs (one global rather severe type of colorimetric image error), and match them by increasing e.g. slightly the blue contributions of pixels, whilst also looking at critical colors like faces. In movie material, further artistic considerations may be involved, e.g. a slightly bluish look for night scenes may be casted, which, if not already largely created by a color filter matching the film characteristics, will typically be done in post production by a color grader. Another example—which may typically involve also tweaking the tone reproduction curves—is to make the movie look more desaturated, to give it a desolate look.

It is of even higher importance to take care of the tone reproduction curve gamma behavior. One might suspect that just applying a 0.45 anti-gamma correction to encode the captured linear sensor data will suffice, but apart from that, the larger dynamic range of a typical scene always has to be mapped somehow to the [0-255] interval. Tone reproduction curve tweaking will also result in e.g. a coarser, high contrast look, darker or more prominent shadows, etc. The camera operator typically has available tunable anti-gamma curves, in which he may set knee and shoulder points, etc., so that the captured scene has a good look (typically somebody looks at the captured images on a reference monitor, which used to be a CRT and may now be an LCD). In wet photography the same can be realized with "hardware" processing, such as e.g. printing and developing conditions to e.g. map faces onto zone VI of Adams zone system, but nowadays there is often a digital intermediate which is worked on. Even cinematographers that love shooting on classical film stock, nowadays have available to them a digital video auxiliary stream (which can be very useful in the trend of increased technical filming, in which a lot of the action may e.g. be in front of a green screen). So in summary, apart from taking the actual room conditions at the viewer's side to be a given to be ignored, the whole color capturing system is designed around a "calibrated ideal display", which is taken into account as a fixed given fact when the content creator creates his images.

The problem is that this was already very approximative in those days. The reasoning was like "if we do a bad job reproducing a scene on e.g. photographic paper anyway, we may relax all requirements regarding accuracy, and a apply a more subjective definition of the technical mapping from scene to rendering, taking into account such principles as reasonable recognizability of the imaged scenes, consumer appreciated vivid color rendering, etc.". However, this technology of image encoding (e.g. as prescribed in PAL, or MPEG2) should be understood as co-existing with a number of critical questions, like: "what if one changes the illumination of the captured scene, be it the illuminance or the white point, or the spatial distribution, or the special characteristics", "what about the errors introduced due to differences in illumination of the scene and the viewing environment, especially when seen in the light of a human viewer adapted to the scene vs. viewing environment", etc.

These problems and resulting errors became aggravated when displays started changing from the standard CRT in a standard living room, to a range of very different displays and viewing environments (e.g. the peak white luminance of displays increased).

SUMMARY OF THE INVENTION

Our below technical solutions are inspired by an object to make image creation (in particular digital video, which may also be digitized film stock material, whether recently shot, or old material remastering) more versatile, to take into account present and future evolutions in image/video/film production, and in particular future displays. Whereas evolution in movie theatres was somewhat slower, a problem started occurring already that actual displays in the viewer's living room had become LCDs and changed in their display properties such as color primaries, tone reproduction, etc. The solution however was to stick to a rigid standard, and make the LCD behave like a standard CRT again, by using tone reproduction curve conversion lookup tables, etc. However, with the appearance of high dynamic range (HDR) displays, such a solution became unfeasible: one just cannot pretend that a first display which is physically (as to black level, grey level controllability, brightness of peak white, etc.) very different from another second display "can be made to behave exactly like" that second (ideal) display. This might work if one really wanted to emulate exactly on a current high quality high dynamic range display the behavior of a low quality display of the 50s, but that is not how people want to use their new high quality displays (why buy a high quality display if it only shows low quality output). Typically, whether done automatically by the TV's picture optimization algorithms, or by the viewer changing the picture viewing properties or preferences on his remote control, these televisions want to maximize their spectacular look, which may involve such things as increasing brightness and saturation of pictures, but this may have several visual disadvantages regarding the actual look of the finally rendered pictures, e.g. incorrect darkness or black regions, cartoonization of the content by excessively increasing the saturation, staircase patterns in gradients such as the sky, due to the fact that the few available codes in the image/video signal are stretched excessively etc.

If one understands that this is not just a problem of a single HDR display, but rather that the television(/movie) world is changing (not only do more consumers view movies on e.g. their low quality LCD laptops, but even on small portable displays like mobile phones and the like), one realizes that it may be advantageous to have a more controllable link between what the actual content was supposed to look like (in particular as determinable at the content creator side, which has available not only the original scene, but also the artists/director of photography intentions a to e.g. what look the scene should have [darkish, mystical, . . . ]), and what it would actually look like on the receiver's side display 730, if no "correct" processing was done, or even "incorrect" display processing, which may worsen the resulting look.

In the past, one always wanted to solve this problem by using some fixed calibration chain (i.e. creating new, better values for the pixel data), a "good once and for all" solution, which may result in an "average" look which is actually really good for nobody, in particular now that displays become so good that any artifact can become annoyingly perceivable. Another trend is that excessive parts of movies are becoming customizable (e.g. half of a science fiction movie may be generated in computer graphics, and the other half may have added special effects), which in turn preferably dictates that also at the capturing side more of the actual environment shot is captured (e.g. the illumination distribution as determinable with a sphere). This point is particularly interesting as a mindset: current imaging captures—even ignoring the above color encoding approximation—too little of the actual scene. Enough is captured for recognizable objects (but that would already be largely realized with binary line drawings), but not for beautifully renderable pictures (whether the criterion relates to realisticness, color impact, etc.). Lastly, since for good reasons (e.g. retraining of highly specialized camera operators) technical standards are resistant to change, the disappearing PAL standard is not going to be updated anymore, however, new standards will emerge taking into account the changed image reproduction environment, taking into account the standard's usefulness with a view towards the future such as ever increasing camera (at present +−14 bit, also of course depending on lenses) and display quality (and e.g. that even plain consumers are using ever increasing quality cameras, which may with their automatic optimization algorithms in the future yield—apart from artistic input—better results than what the average old days camera operator was producing, and they may want to see their pictures of monument valley on their HDR display as if they were still there). Therefore, the present invention and its embodiments offer at a good time solutions to further improve the controllability of what an artist would like people to see versus what would be displayed e.g. on a home television (and this can take several forms depending on what kind of artist and his preferences, from an "I mostly want to do nothing, letting the viewer or television manufacturer doing the controlling—view" in which e.g. only severe modifications of the content as finally rendered by the display are forbidden, on the one side of the spectrum of control options, to on the other side of the spectrum attempts to bring a rendering as close as possible to an ideal reproduction of what the artist intended, given the rendering side limitations). Thereto, in addition to the normal (as one could conceptualize it as "linear, one-to-one" coding, which is actually what e.g. a CCD sensor set to a certain sensitivity does) pixel based coding of the image, it is desired to have an additional metadata, indicating what that pixel data actually means, and what the receiving side is supposed to do with it, e.g. regarding pre-rendering image processing. It should be understood that linear pixel coding is, although very powerful in its versatility to encode every scene, also relatively stupid (the other side of the coin), in that more can be said about the "blindly" encoded pixels. This can be done by introducing "color regimes". So it is important to understand that the regime is not necessarily again a (blind) numerical representation of the actual "object-shading" in a certain region, but something additional about the scene, which can depend e.g. on which different classes of things (objects, spatial regions, illumination categories, etc.) there are in the scene, or even how an artistic person would see the real captured, or artistically improved scene. In that sense, it should be understood that all creators can use this invention, both a camera man (actually annotating properties of the at that moment captured scene), and a later post processor like e.g. a color grader (who may e.g. want to artistically reinterpret the captured scene). The concepts are more easily grasped if explained with a few illustrative examples. Even if one always will have examples that the actual pixel coding (especially when in [0,255] but even possibly in HDR encodings) may involve pixel values that do not accurately reflect the underlying scene object and its color characteristics [the term color will be used loosely as also including luminance/lightness only] (e.g. 255 white may represent a white wall in a somewhat darker region of the picture, as well as light reflections on an eye, as well as the interior of very bright light, or even the clipped blue sky), one may desire to denote the object or region of pixels as a certain type of image information, to which a certain display side rendering action should correspond. E.g., according to the new codification as desired by the content creator, a certain dark region should be so displayed that before a certain time moment a horror monster is (nearly) hidden in the dark, but after a certain time moment it becomes visible to a certain degree, which regime may be denote as "dark_hidden". One can more precisely specify how much of e.g. a person hidden in the dark emerges, e.g. 25% of his body, or even exactly the part of his face. One can imagine if doing this blindly, more or less than desired by the content creator may actually be visible on the rendering side, e.g. due to backlight boosting, light reflecting from the display face plate, etc. Only when knowing by co-encoding what was intended, the rendering side can—knowing all its local limitations—take care of actually achieving or approximating the intended rendering (which cannot be done when simply having pixel encoding, or something similar). Another example is that if one knows which colors are typically average lightness reflected colors as encoded in the scene, one could render them so that they are of coordinated luminance as the actual average lightness reflection colors in the viewer's living room surroundings. The object of the present invention embodiments can be realized by having a method of adding image defining information to an input image signal (I), comprising:

showing the input image (I) to a human operator;

receiving via a user interface (303, 308) descriptive data (D) from the human operator, the descriptive data (D) including at least luminance values and/or geometrical shape information on the one hand, and a regime descriptor (rd) on the other hand;

encoding into an output description data signal (DDO), relatable to an output image signal (O) based upon the input image signal (I), of the descriptive data (D) in a technical format standardized to be intended for use by a receiving display to control its image processing for changing the color properties of its rendered images, and by corresponding apparatuses at the image creation side, and corresponding methods and apparatuses at the display side, and in particular, several possible coordination signals to describe the regimes, and what the display side system should do to approximate the intended, desirable final rendering (which may e.g. be an as close as possible approximation of the original scene, but taking the local viewing site environment into account, such as white point of the room lights etc.).

So a color grader can with the directions of the director, look at the scene, and identify e.g. a part of a commercial lightbox on a wall (which may be specified as an approximate location and color values, e.g. by drawing a rough ellipse on it, and further segmenting), and designate that this is a special region, but now also encode this as what special region, namely, what rendering regime should be applied (e.g. make "flaming eyes" (rd) on the person in the lightbox, and coordinate the surround light, as would look best given the specifics of the rendering display). He may then process the input image in an encoded output image O, which according to the above philosophy would be kind of an average look (one can compare it with a latitude leading to nice recognizability of most objects in a captured picture, but then with the additional description data specifying the regimes, one can transform this average encoding in much better looking pictures in all different viewing sites.). Image processing algorithms on the display side may then e.g. apply tone mappings, or other image processing operations especially to modify the look of local regions, to specific regions, according to the regime descriptions.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept, and in which dashes are used to indicate that a component is optional, non-dashed components not necessarily being essential. Dashes can also be used for indicating that elements, which are explained to be essential, are hidden in the interior of an object, or for intangible things such as e.g. selections of objects/regions (and how they may be shown on a display).

In the drawings:

FIG. 7 schematically illustrates a display system on the receiving/rendering side, and apparatuses and components to extract the regime specification and control the images processing for the final rendering on the basis of that.

DETAILED DESCRIPTION OF THE DRAWINGS

Figure 1:
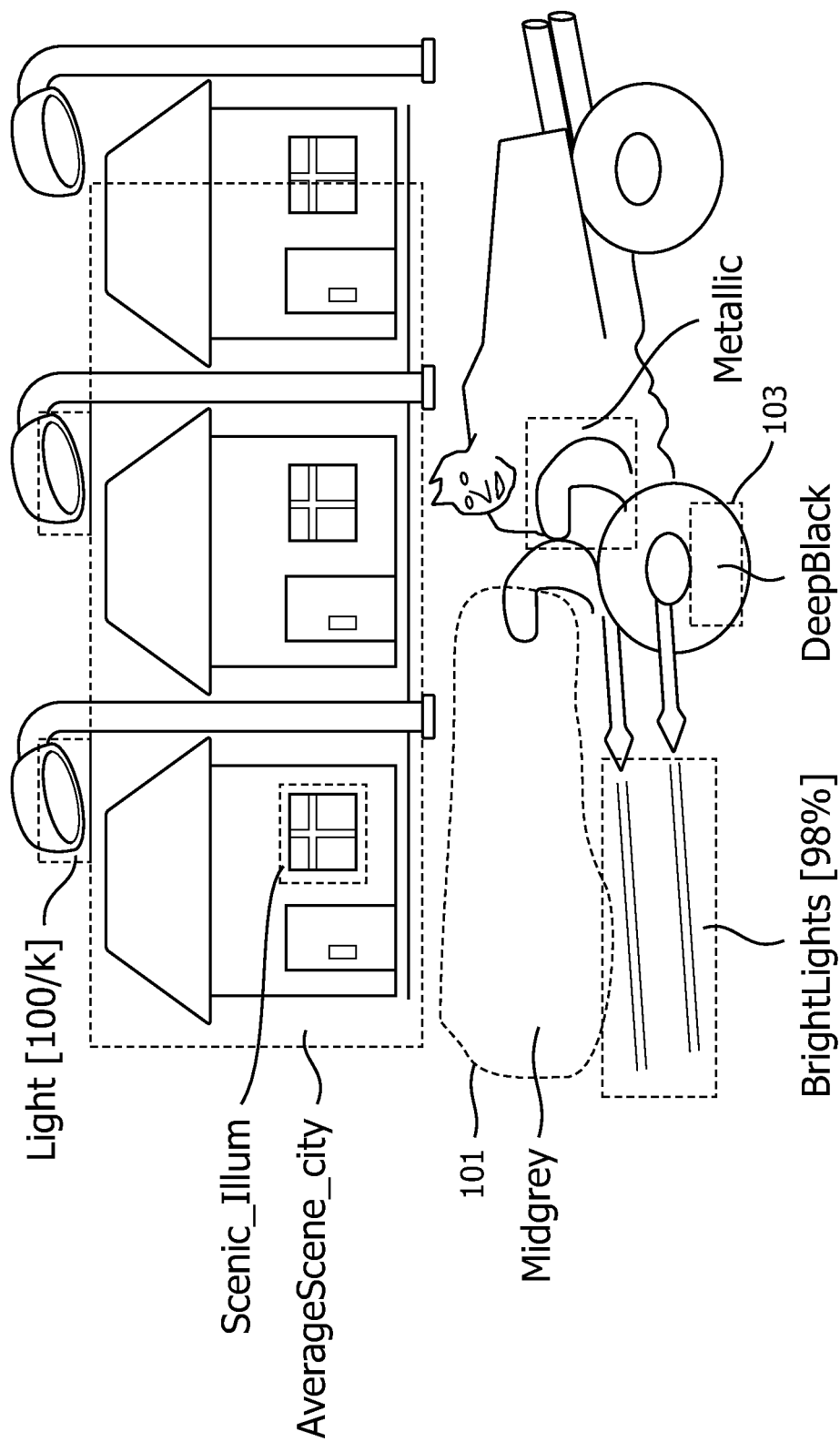
FIG. 1 schematically illustrates a few of the typical regimes which would be desirable and achievable using the principles of our invention on an exemplary movie scene.

Figure one shows an example of a batman movie, and some effects which can be realized on a HDR display with the current invention. At this moment, HDR displays can use whatever their internal processing is to "optimize" the image, which is however oftentimes so geared towards light output maximization (or saturation boost). So, the picture may not be shown optimally at all, perhaps even rendered in an ugly, unrealistic way (e.g. fluorescent bananas), at least not what the artist would have originally intended. Typically the boosts—even when parametrically, and dependent on image properties such as histograms—are of a "stretch-all" type boosting all pixels similarly (however, when e.g. boosting some road lights, one may not simply want the grey road around it to become increasingly bright similarly: a more realistic rendering may depend on the distribution of color values on the road—or even its spatial/property analysis, like texture—and make e.g. water droplets on the road increasingly bright together with the lights in the image, but not so much the diffusely reflecting parts of the road). Or, in a computer game showing a dark basement e.g., one may indeed want to boost the power of some lights, but do something entirely different to shadow regions, dark grey pillars, etc. (in fact the optimal processing of the regions may be so nonlinear that no global processing, or even not even any function derived solely on the display/receiver side will do a good job). To get out of this conundrum, the creating artist can specify "color regimes", which may be few and simple, or many with complex details, but allowing the creator to have a say as to what can, will, or alternatively must not happen to the final look (i.e. implying typically the processing applied by the display on the received input signals for the pixels in its different regions).

In a simple variant, the artist will annotate regions of the image histogram (often of spatial subregions of a picture, but they may also only be e.g. luminance, or color values for a shot of successive pictures), and give them a code indicating which regime they belong to (which may be a simple indication of what these regions mean). Although complex descriptors of the multimodal spatial-histogram distributions in a region may be employed, we will explain here a simpler case in which the artist only gives a luminance range for the region. To begin with, there is typically a range of luminances (or colors) in the coded image (which will be transmitted to the receiving end [whether on a television cable, a memory device such as a bluray disk, etc.] and serve there as input image [note that the output image O of the creation side is typically the input image on the receiving side]), which will be e.g. between the minimum and maximum luminance in an (arbitrarily shaped) region 101 selected by the artist on this input image. Corresponding to the interval in the picture, on the reproduction side there will also be at least one output luminance interval, e.g. as rendered outgoing light of the display, or an image processing modified driving image for the LCD pixels. E.g., the minimum luminance may have an offset added, and the range may be stretched by a multiplicative factor 2. However, the (preferred) reproduction scenario may be more complex (e.g. for a bimodal histogram—because region 101 contains mainly two "kinds" of object, the somewhat darker ones, and the normal luminance ones—one may want to prescribe nonlinear mapping functions which keep a relationship between e.g. the average luminances of the subhistograms, so that their ratio doesn't become visually unrealistic). In fact, luminance range mapping has usually been considered as a problem of cramming all the input range pixels in the output range, usually with the technical limitation of clipping (or similarly not taking care of visibility constraints for the dark values, making them effectively invisible to the viewer because they fall below screen reflections), which is done by one of many heuristic smart tone mapping algorithms. However, if one has a (factual or artistic as regards what the pixels encode) meaning for all the subregions of the histogram corresponding to objects, one can make a much smarter allocation of the optimal output luminances to pixel regions, not only to give the entire image a balanced look, but more as a (parametric) coordinated hierarchy of smartly superimposed object-related ranges, even with optimal positioning of the pixel region color values within a single selected object with a particular meaning E.g., one can imagine that one want to coordinate the rendering and in particular the luminance range allocation of first pixels corresponding to a light inside a shop, with other pixels visible through the shop window on the one hand, and lights outside the shop on the other hand, knowing e.g. that such coordination relationships will tune the visual impact. The region 101 determines (preferably all, although it may also function as a color/texture property region for teaching the receiver how it can segment all similar regions) pixels to be coded as "Midgrey", which in this case is a plain grey road. Note that in this text we will for simplicity often talk of the receiving display 730 doing the rendering processing, but the skilled person will now that other apparatuses such as a bluray disk reader, a settopbox, or a personal computer, mobile apparatus, etc. may do all or some of the signal processing yielding the final image to be displayed IR. Since the television may still do its own additional processing, a distinction is made between the output signal IR' of e.g. the bluray player, and the one IR finally displayed on the monitor, tv, projector, etc.; see below. Communication between the two devices for communicating their image-related physical properties, and measured viewing environment properties may preferably be available. Not only has coding this Midgrey region as being of a particular type the advantage that it can be optimally rendered (plainly, i.e. of not too high luminance—e.g. related to an average grey luminance in the viewer's room- and having a low saturation, which may involve putting a limit on the boosting algorithm parameters of the display, or even invoke a desaturation operation [instead of giving the movie a paler look for all scenarios, this can in this way be done tuned per display/viewer, i.e. (partly) taking into account his visual accommodation state etc.]), but also it can aid all scene analysis/understanding algorithms at the receiving side. E.g., it has always been a daunting task to separate the scene illumination from the scene object reflectances, and selection of this grey area can help (it can be seen as the equivalent of an a posteriori McBeth checker), in particular if it is co-stored in the output image signal from the capturing side with light properties measured in scene, such as e.g. the actual luminance of parts of the scene corresponding after projection with captured image locations falling in the selected region, color cast imbalances (perhaps even measured with a simple spectrometer), etc. The quantification of what the grey was like in the original scene and/or what it should preferably look like in the final rendering, can then be used to e.g. more optimally render the other colors, or change ambient light (which may be of the ambilight type directly surrounding the display, or light speakers creating illuminations in several locations of the room in synchrony with the displayed images), etc.

Other important types are the difficult components of dark color regimes (which have up to now been largely ignored). They may be present (and should behave differently, i.e. lead to different display processing and rendering) either in normal light scenarios like in FIG. 1 [black motorcycle tires and batman's cape, but under normal illumination], or in dark scenes (like horror movies, in which the entire scene is optimally processed to give an overall darkish look, emphasizing mostly on the property of visibility (see corridor example below), and preferably coordinating with the room illumination, such as lowering the light speakers, and codriving them with the picture content). In this example for the artist's convenience and to keep the color grading expenses low, a single regime code for the dark regime is used, namely "DeepBlack". Depending on the properties of the display (and preferably also the measured viewing environment, see below), the display will be controlled to process this in a balanced way, so that on the one hand the region looks very dark, but on the other hand where possible it still shows texture. For a high end HDR display in a cinematically lighted living room, this will result in a different processing (namely mapping on a dark region of luminances, in which there are still a number of actually visible just noticeable differences (JNDs) present) than on a typical television and living room as at present, or even an outdoors mobile display (which will just clip the entire region to minimum black, so that at least some darkness intent is suggested).

If one starts "stretching" luminances (or colors) to at least very bright, and perhaps nicely dark, it is important to have some reference (or at least regions which are not changed too much). Thereto, the artist may use "AverageScene" codes, of which he may use a single default one (to which the display reacts as if it was e.g. an Adams V value, which e.g. may be mapped on the display around what is 18% of typical low dynamic range maximum white being 500 nit; or equal to a multiplicative factor times the average luminance of the viewing surround, etc.), or he may use several variants (so that a complex allocation can be done of darker greys, versus brighter greys more conforming to the brighter white display etc.; a HDR display may then use these several greys, whereas a lesser quality display may render as if there was only one grey reference). In FIG. 1 "AverageScene city" is used, in which the artist may incorporate actual knowledge of typical cities (they are composed of bricks of a certain reflectance), or his rendering intent (the houses may have bright paint on them, and the color grader may want to specify that this is rendered on the display with an output luminance between Lmin and LMax, and a saturation between 5 min and SMax). Note that although the artist may want the houses to look bright indeed, they are still part of the background, i.e. although beautifying the movie, they are not the predominant objects, so they should also not become too predominant as to their rendered colors (e.g. luminances), which the artist can control by specifying that whatever algorithm the display may want to use, they should not go above the maximum (LMax, SMax). Of course more complicated rendering specifications can be given, in which the artist can specify values like "optimally approximate to give the average of the region a value LAopt—and the maximum pixel LMopt", "in case of boost try to stay below or around and intended average luminance for the region LAint", "in any case stay below LAforb", etc. This allows more freedom regarding the display manufacturer's color processing (in advanced systems, the artist may even want to prescribe exactly what processing a particular display performs—to enable the "intended rendering" mode—but in general, displays will do their own processing, which may be quite simple (and not allow much tuning)). E.g. "try to stay around LMint intended maximum color" will then suffice for both sides, creator and display manufacturer, and the display can e.g. predictively or iteratively measure whether its rendering has given the region a sufficiently close luminance/color.

Important in HDR are also the brighter regions, in particular it is important that they can be coordinated relatively to other regions (that not everything looks brightened to the same degree: as a guideline for discriminating, the artist may use such properties as local chroma, duration in time of the display of the region [e.g. to create a special bright flash effect, when the region is a fireball] etc.), i.e. that one has available the right regime codes to discriminate them. A region may have a first regime code for a first time instant or time span, and a second regime code for a second, e.g. "fireball" versus "extinguishing fireball". In the FIG. 1 example, a discrimination is made specifying the "BrightLights" code, which can be used for batman's laser rays, and which has as additional parameters indicating that the intention is that the display renders them at around 98% of the maximum achievable brightness (for that blue color). The streetlights that are always on in the shot, and should not give such a distracting spicy effect (note that in a real scene the viewer may look around them differently than on a small diagonal display, the diagonal being a factor which the display may use to determine their final luminance, if desired also under control of the artist), so they will be given another regime code "Light", which will be rendered at a luminance being the maximum achievable luminance divided by a certain factor, e.g. k=4 (depending on how bright the display can be, one wants to reserve more or less for the reflecting scene object pixels versus, far offsetted from those, the light source pixels).

Another light code can be used for light pixel regions which give a scenic illumination, e.g. the light shining through the window in a wintery scene. The artist may want to give only some of the illuminated windows a "Scenic_Illum" code, e.g. those having an eery bluish light instead of the normal warm incandescent. These can then be re-used e.g. to drive the ambient lighting, which is now coordinated not with a heuristic average of what's happening in the scene, but a real light in the scene. E.g. the ambient illumination calculator may use as input only the warm incandescent regions. This regime specification may be re-used e.g. according to the patterned ambilight projection invention of WO2007/113754, by creating a spot of the window light color (and if possible also geometric distribution), and continuing to move it outside of the display with the speed of the video. Even though the lights may not actually be exactly what's in the video, if the artist selects a typical room window, this will be sufficient for ambient environment simulation. Also the Brighlights regimes can be used to flash e.g. the light speaker which is 90 degrees sideways of the viewer, to simulate reflections on the viewer's living room walls, etc.

Lastly an example has been shown to show that the regime encodings are not purely intended to parametrize multiplicative-type mappings (like offsetting and scaling a range of colors), but that more complex spatial profile control may be desirable, and compatible with what nowadays color graders desire.

Figure 2:
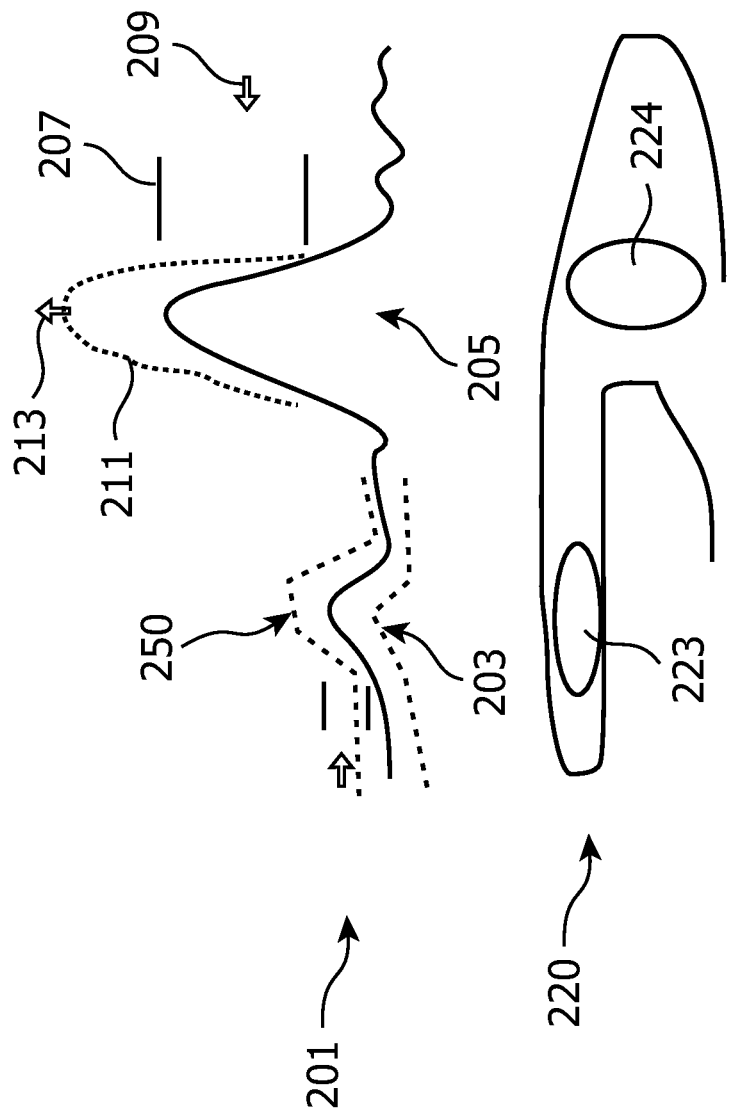
FIG. 2 schematically illustrates how one can specify a complex geometrical profile with several light reflection regions which need to be coordinated (with each other and with other regions of an image)

The metallic parts of the motorcycle handles are given the code "Metallic" to indicate that they behave very differently in an actual environment than Lambertian diffusing objects which are relatively easy, and because especially parametric modification may introduce artefacts, they preferably have to be treated in a different way, which is elucidated with FIG. 2.

FIG. 2 schematically shows what would be seen on a screen of the color grader running a software tool for improving the captured video and doing color regime specification, and how he can specify more complex color rendering behavior for the metallic handles of batman's bike. View 201 shows a cross-section luminance profile, and that the handle (which is shown geometrically as subpicture in view 220) mainly reflects average surround (which will not be so critical) but also specularly one of the light post lights leading to profile bump 205 (specular patch of pixels 224), and the blue laser flashes leading to bump 203 (patch 223). It would be strange if the profile is updated coordinating with the entire scene, which likely will coordinate with the light post light, but that the other specular highlight stays dull, although a laser fires nearby. Preferably, to be able to artistically optimally coordinate the specular objects with different renderings of the display scene (e.g. the user increasing the brightness) an apparatus is provided to the color grader (typically a software module) which is arranged to create and modify luminance (and possibly full color, including chromaticity) profiles of pixel regions. This can be done e.g. by modeling a part of a profile (either explicitly as adjacent pixel values, or by fitting parametric functions like e.g. multi-Gaussian decomposition) and allowing the color grader to tune this, e.g. change the amplitude of the bump. An example of software behavior is that the grader can indicate a range 207 over which the bump is visually predominant and needs changing, which range can be drawn with selection cursor 209. He can then scale the original bump profile to a new stretched profile 211 in steps by clicking on selection cursor 213, so that the new look is in tune with a changed global or highlight or scene light brightness. He can e.g. look at the effects on a high quality HDR display, and toggle it into several emulation modes for lower quality displays. Different options are available. Either a tunable function (which will typically at least have as a tuning parameter the average luminance of one of the light post light areas) can be stored in the video signal (metadata) to be outputted for use (e.g. on a Bluray disk), and the display mandatorily uses this function as color processing for the metallic region (as a function of the viewer's brightness preferences etc.), or one or more reference models (e.g. resultant pixel profiles) are stored for the display to use as guidance when applying its proprietary color algorithms. E.g. spatio(temporal) profiles for three kinds of displays and 4 lightness levels for the high end display can be encoded as starting point, and the HDR display may copy the highest brightness (mostly stretched bump) profile as starting signal, upon which it may then employ a limited amount of further processing. Although this is not a 100% accurate rendering of the metallic region, it being controllable yields better results than doing things blindly. Alternatively, for a parametric encoding of all the illumination effects on the handle, the rendering side may calculate an optimal bump shape for its viewing environment (display characteristics, surround, etc.) Another example of the need for/and allowing of the methods/apparatuses of the present inventions of spatial color rendering control, are reflections surrounding a light, e.g. on a brick wall. Typically in uncontrolled LDR systems, they will map somewhere to a valid code in [0,255] (sometimes 255), and then postprocessing to generate HDR in the display may not recognize them as specific regions (potentially even with overexposure) and scale them like the rest of the average background, instead of co-scaling them with the increased brightness rendering of the light. This can be achieved by either allowing a spatial subprofile rendering intent specification in the "Light" profile itself (e.g. co-map with the average brightness of the lamp, and a reflection parameter such as an albedo, or apply a parametrized function like an exponential downfall), or an additional profile may be created, namely "Light_Reflection", the properties of which are co-tuned with those of the "Light" profile (e.g. the system already proposes a rendering for the reflection profile to the artist, which he may easily finetune with control parameters).

Note that these examples are purely illustrative to describe what kinds of control between artist/capturing side and display processing and rendering are desirable, and many more variants can be included. In a simple system, a couple of frequently usable scenarios are fixed encoded in the standard (knowing exactly what would happen for each scenario), but of course, the image property communication standard may be upgradable, in that the artist codifies a new class (e.g. "HamsterFur", or "RailingWood"), and specifies its colorimetric properties, perhaps texture properties, amount of modification which may be applied (e.g. until the look becomes unrealistic: if one brightens dark wood, the grain pattern may become cartoonish), and if desired even particular types of processing algorithms, parameters, equations, . . . (e.g. a saturation algorithm, a derivative-based local brightness stretch, or other image processing algorithms like an upscaling which also leads to different visual colorfulness, noise processing, etc.). I.e., the regimes descriptions may be supplemented with all kinds of further information regarding how to render, process, modify, improve, encode, etc. the regions. Other examples of interesting regime codes are e.g. "Pastel" (often the excessive saturations boosts in displays make pastels disappear, and e.g. sunsets may look unnatural; this code can enforce them to stay pastel in their final rendering), "CommercialBoost" (which allows e.g. during commercials to boost or even depending on the display differently render certain objects: e.g. a multiprimary display which is able to create highly saturated oranges may color an initially more yellowish object into bright orange).

Figure 3:
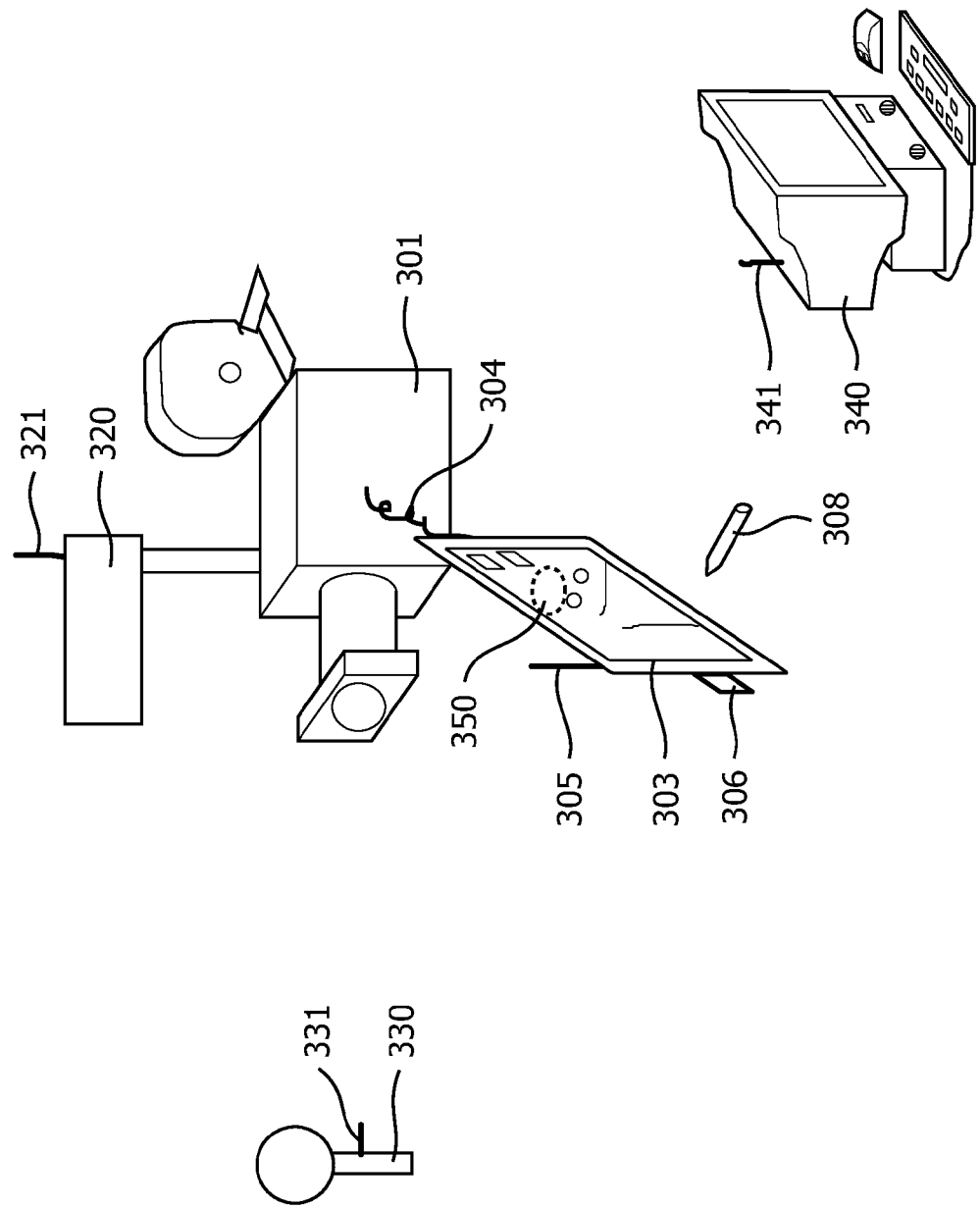
FIG. 3 schematically illustrates an environment and its apparatuses allowing an image/movie creator to add color regimes to a captured scene image.

FIG. 3 schematically shows some of the apparatuses present at the creation (transmission) side useful for creating a good color regime description signal. We describe a more difficult scenario where the apparatuses are integrated with a classical celluloid film camera (note that the digital assisting representation of the scene will only fully [as to the pixel values of the analog vs. digital recordings] be linkable to the actually captured celluloid picture if movie material calibration models are incorporated for mapping the two (however, the development is then still an unknown variable that can be supplementary played with), but even without those, the digital recording can still yield very valuable side information, e.g. if it is geometrically co-registered with the celluloid captured view window, one can define regions, and apart from the celluloid captured developed grain values one can code e.g. linear actual scene view values via the digital capturing), because the skilled person will understand how to transpose these components to a fully digital capturing or the room of a color grader, or a transcoder doing the same for e.g. an old Laurel and Hardy picture.

We show attached to camera a digital display 303 (which e.g. gets a feed from a with the camera lens co-registered CCD), however the connection 304 need not be fixed but can also be a transmitter for a number of separate displays (e.g. one for the camera operator and one in the overview stack of the director). Upon it the camera operator or director of photography can draw e.g. a region 350 which they know they have calibrated with their stage lighting as a dark part of the image, which can be done with e.g. a light pen 308 or other user interface input means [we show only one example, because we think the skilled person can well understand which types of system allow a user to give feedback on a displayed image]. The display may store added information (e.g. regime specifications) onto a memory 306 (e.g. a detachable memory stick), or communicate via a transmission system 305. It can also receive further information from an in-filming-situ scene analysis device 320 (which may simply be a light meter or even a spatially sampling spectrometer), via its transmission system 321, which may also transmit to the final data accumulation place (i.e. 340). Furthermore, in-scene meters 330 (e.g. local illumination meters, to measure how actor's faces where illuminated, especially when with highly variable lighting; sphere systems looking at the surrounding illumination distribution; etc.) may transmit their data to any part of the system via their transmission system 331. The receiving display can then try to reproduce the light in its original brightness, or at least a fraction (or function) thereof, typically in accordance with some psychovisual model for creating a similar look (typically coordinating the looks of the different regimes in addition to different colors in the image). All data is accumulated on a data accumulation apparatus 340 with on-board memory, typically a computer (with transmission system 341).

Not all components need be present, a simple digital duplicate (on display 303 may be all that is desired by the director to make some simple annotations for only a few regime codes), however, as the skilled person understands, the system can be expanded with apparatuses to analyze the entire environment in detail (color values, light properties such as light direction or spectrum, object bidirectional reflections functions or textures, etc.), which is not only useful for contemporary computer graphics effects insertion, but both the final living room display rendering and ambient lighting will benefit if more details of the scene as to both its reflecting or in general light-interacting objects and the actual illumination are co-recorded with the final image signal (this allows better relighting to become more in-tune with the viewer's environment).

Figure 4:
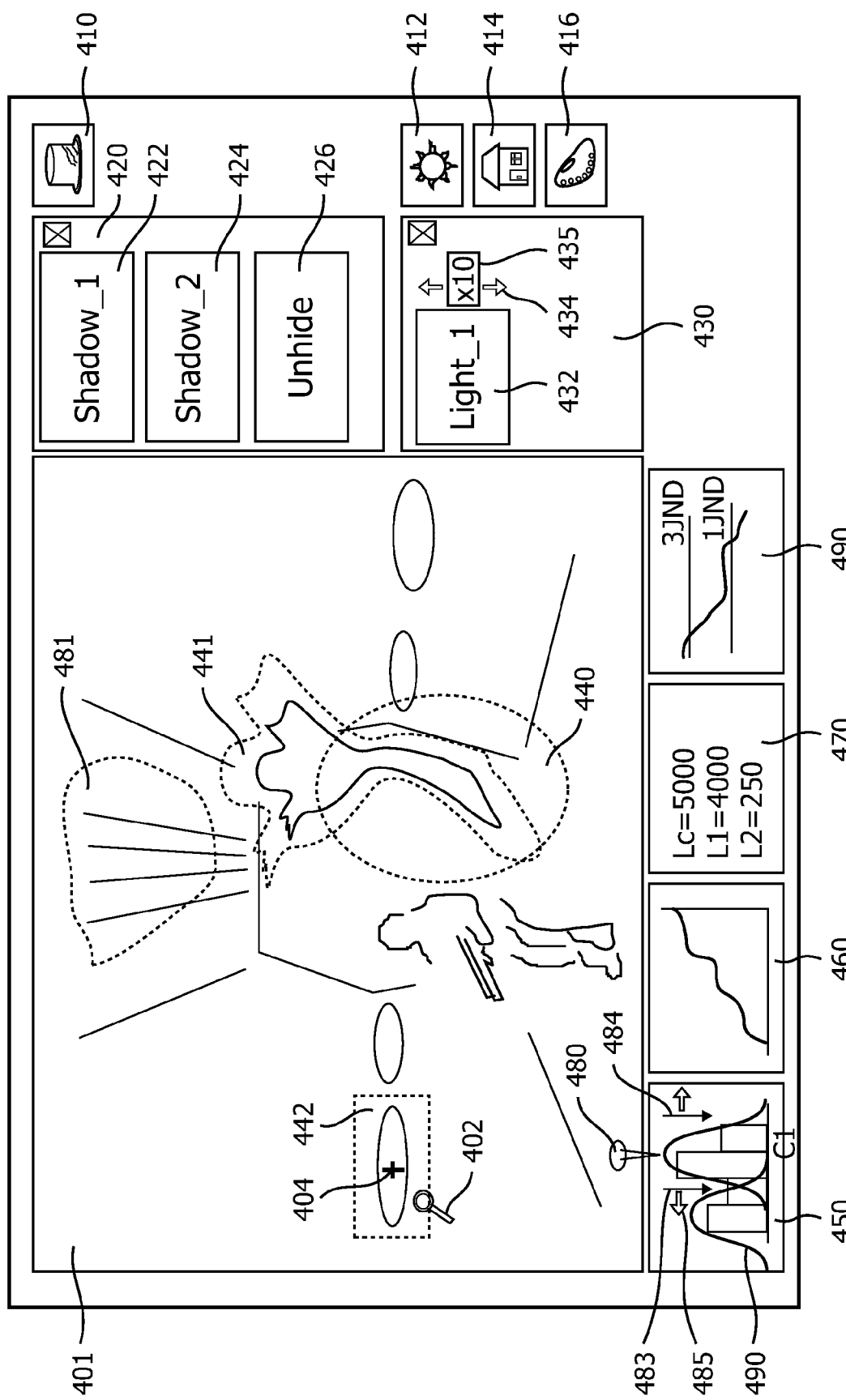
FIG. 4 schematically illustrates a user interface display of what the artistic color specialist at the creation side may see, as to the composition of the captured images, and the regimes which can be identified in them, and transformations which may be applied to them, and some schematic examples of widgets that can be used to easily interact with the data, and create a regime description.

FIG. 4 gives an example of what a regime annotation apparatus (or typically software) will be arranged to show to a color grader, or a director of photography e.g. from its wirelessly communicated feed from any camera, and allow him to annotate, and store into the outputted image signal as metadata. Shown is a corridor with a photographed soldier, and a monster (which may be a simplified rendering of a computer graphics element to be added later) in a picture viewing area 401. On the left are regime cluster buttons allowing to quickly select useful regimes, e.g. a "DarkRegimes" button 410, a "BrightRegimes" button 412, a "AverageSceneRegimes" button 414, and a "CriticalColorRegimes" button 416 (of course there may be more, this is merely a conceptual illustration for elucidating the invention concepts and claims). When one clicks the regime cluster buttons, a hierarchical menu pops up showing further buttons ("Shadow_1Regime button" 422, 424, 426) with selectable regimes for that cluster. E.g. for the "DarkRegimes" cluster, the operator has identified a region 440 which he wants to be "Shadow_1" (i.e. the regime descriptor rd of the descriptive data D is "Shadow_1" and this code or another codification derived from it will be added in the description data signal DDO resulting as output), and will typically later proceed to specify some characteristic rendering and possibly further identification properties for it (the other scenario being that only the regime itself is specified—whether as a set of luminances or a region of pixels—and the display knows by itself what to do with shadows, e.g. render them as dark as possible, without needing any further specifying luminance or color properties), so that the receiving display will know how to preferably handle it image processing/rendering-wise (e.g. a specification that no pixel in that region should be shown brighter than Lmax in the viewer's living room, or in a cinema theatre—the latter being recalibratable on a single reference encoded number in the description data signal DDO which will be further transformed to an in-situ usable value (e.g. 100 Cd/m2 may be changed into an actual cinema measured value, and similar for other values), or an actual exact number being encoded, e.g. per theatre or viewing room type). There may be several specifications to define dark regimes, and their final rendering. E.g. one can take into account the position of the histogram of the dark pixels, and make sure that an upper part gets a certain position e.g. compared to the rendered luminance of mean grey pixels in the image, whereas on the other hand, not too many pixels are badly visible due to the glare of front screen reflections etc., so some tone mapping may be involved, e.g. posterizing the dark region. The system will typically have modes allowing for minimal user interaction (as the artists' time is expensive), and automatic image analysis algorithms can aid in finetuning (see FIG. 5). The user can very precisely delineate a spatial region on the picture which he wants to treat, e.g. by moving the electronic pen 308, on an exact border of where the shadowy region may be drawn, but also a rough indication may be given like an ellipse or a rectangle 442. Because the greatest degree of control to specify regimes for selected objects or regions is offered if the user can both work on color/luminance properties (typically histograms) and image regions, there are additional information panels (450, 460, 470) which not merely display the image information, but are widgets in which further selection can be realized by the user (of course for the many variants of annotation apparatuses/software several or fewer of these components may be present to realize the job, e.g. only setting luminance ranges, or only drawing spatial regions). E.g., when the colorist selects a region 442 for highlight regime specification around a capture light in the image, a histogram display panel 450 will show a bimodal histogram, containing the bright pixels of the light and the darker pixels of the dark surrounding wall. Advanced systems will model functions 490 on this, and allow the colorist to analyze, select and/or modify the selected regions and their pixel content on the basis of this complex information, but in simpler systems (although the models may still be present because they aid the understanding of the colorist of the local image structure/color properties, but then they are not modifiable) the colorist can e.g. use cursors 485 to select ranges (483, 484) of e.g. luminances, to specify which colors e.g. belong to a bright light regime (encoded with regime descriptor "Light_1"), whether globally in the entire picture (if they don't problematically occur in other objects anyway, or locally for that co-encoded spatial region. Mutatis mutandis to showing the histogram of a selected image region, when selecting a range of pixels in a (e.g. local) histogram, the system may show the corresponding region(s) 481 to the colorist. One can also work with local measurement cursors (a tool of image interaction helpers may e.g. contain a spyglass cursor 420, which e.g. can set a crosshair 404, from which the value can be displayed in a luminance panel 470. This panel may contain coded-in-input-image luminances, or actually measured scene luminances, e.g. of a centre of the light Lc=5000, of selections where the light is less bright (L1) being critical for optimally specifying the regime, if desired particular algorithmic transformations etc., the surround (L2) etc. The luminance panel 470 may have corresponding panels allowing the colorist to specify which original scene measurements he desires to be cosaved. E.g. although the light may have a code 5000 in the captured input picture I, it may have a luminance of 9000 Cd/m2 in the actual scene as captured in situ of the camera, so this value may be costored with the other descriptive data D for region 442, or a ratio or other derived property may be stored. Vice versa, a sampling cursor 480 in property representations can map to the geometrical image, e.g. by placing crosshairs 404. This is merely a simple exemplary conceptual description, the skilled person understands that complex tools can be generated to e.g. indicate subhistograms and modifications, tracking what happens qua image rendering, or the number of selected pixels or shape of the regime etc. with many interactions of the colorist. E.g. he may want to specify two kinds of regimes for the highlight rendering, one with a smoother gradient, and one with only a couple of different luminance values (which may show highly banded on a quality display, yet not on a mobile outdoors display), and these may map with spatial clickable indicators on top of the movie image, so that he can quickly toggle between them (the high quality display for reviewing may then emulate e.g. typical outdoors sunlight lowering the image quality; by simulating, one can quickly overview e.g. which luminance positioning—e.g. the ratio of the average luminance of a first region e.g. a light, versus a second, e.g. the wall around it—works best under certain situations, before coding some or all of this). Because regime coding may oftentimes be linked to the rendering of ranges corresponding to pixel regions/objects which may or may not be actually specified regimes, this also relates to the transformations of these regimes. Typically, whether conversion to an LDR or a HDR image representation, one may want to apply tone mapping curves on pixel regions. For the light example selected in 442, one may have already prescribed tone mapping for wall values, not necessarily only surrounding the light in 442, but typically for the major amount of well lit pixels in the entire image. Tone reproduction modification panel 460 allows making such changes (while being able to judge the effects on the grading display 540) and to wisely select the (e.g. light) regimes (in particular e.g. to which ranges of the reproducible gamut of the receiving display those should map) in correspondence with the look of other regions/elements of the image.

So in this simple example, the grader may want to specify as further image region identification data in the descriptive data D the rectangle 442 data (coordinates of topleft and size), and/or the range of the identified subhistogram C1 identified by the grader (Lmin1, Lmax1). Both the image analysis apparatus/software 500 at the creation side and the receiving display or any intermediate apparatus may further finetune this region identification information, e.g. by means of a segmentation module 522, the actual light elliptical shape may be determined (smart algorithms may not need accurate specification of the range in the luminance histogram, since they can use these as guidance seeds in a mode which e.g. segments taking into account dominant image edges on the borders of image objects) Furthermore, as to what the receiving display should do with the identified regime, as said above he may either use default proprietary transformation according to only a few predefined standardized regimes (e.g. make the lights as bright as possible), however, the artist may find that look excessively ugly, and more tightly specify, if not the actual processing of the receiving display, then at least in what final rendering look (output colors) that processing would result. E.g. with buttons 434 he may specify a multiplier 435 which e.g. states that preferably the lights should not be brighter than 10 times the brightness of the average luminance image regions (the ones which are typically optimally illuminated when capturing the scene, and which will get allocated a large part of the LDR gamut). The artist may specify the luminances of different regimes compared to each other determined on new physical quantities like e.g. impact, or annoyance (e.g. depending on the display white luminance, patches of certain size and brightness may distract too much from the actual action in the movie, so the artist may with a parametric equation specify their absolute or relative—e.g. compared to surrounding image regions, or display surroundings, and/or a local average luminance, etc.—luminance levels, to take these quantities like annoyance into account). So parameters specifying the rendering on the receiving display (i.e. typically the image processing algorithms it will perform) can be of various types, including actual parameters for mathematical image processing functions, but also e.g. parameters encoding a rough approximation shape specified with line segments 250 into which a curve should fall, e.g. a reflection profile as in FIG. 2 (leaving some room for different processing to the receiving display, but not too much).

A more complex example is the "Unhide" regime 426 applied to the identified monster region 441 (which the grader may have outlined with medium precision, i.e. not just an ellipse, but not pixel accurate, and then the segmentation module may collocate the region 441 with the object boundaries, and a motion tracker 524 may track it in successive images). The difficulty here lies in the receiving display rendering however. The purpose is that the rendering of the monster is or isn't just visible in the dark (the colorist may e.g. specify that its face is barely visible and its body not yet), which i.a. depends on the exact surrounding pixels (so a spatial profile may need to be applied, and this may have to be finetuned with spatial profile allocation panel 490/module 590). For the user's convenience in changing the intended rendering, profile shapes may be specified not just in luminances but in other calibrated units, such as JNDs (for one or several typical display scenarios). For optimal effect, this also depends on calibration of the images/video for the receiving display in its environment. E.g. upon startup of an optical disk movie, a BD live application can ask the viewer if he wants the optimal experience, and show him a couple of dark patches which he still has to differentiate with his room lighting, or a movie theatre may be calibrated, several times or at a few times, e.g. with a camera or other measurement devices for the displayed content in the back of the cinema etc. Such issues are much better controlled by the grader than ever by the cameraman and lighting director (especially if computer graphics manipulation is involved) [see also below for some further examples of what can be achieved by this system when classical camera capturing becomes impractical, especially for HDR]. As other examples, we show how regimes can be used with subtypes for specifying rendering differences, and to match rendering with different categories of displays. Suppose we have an explosion, which geometrically covers a significant percentage of the image area. Boosting such an explosion too much may distract from the story, or even irritate. So the amount of boost of the fire, may depend on such parameters like area, time duration of presentation, color, surrounding colors (e.g., one may want to render the sun very bright in a science fiction movie where one flies towards the sun, but less bright and relying more on hot colors, when rendering it in the sky in a desert scene; this could be encoded with Brightlight_1 vs. Brighlight_2, different regimes of high luminance rendering ranges), but it may also depend on the texture structure of the fireball, e.g. how much dark smoke is covering it (if there is more smoke one could make the in-between glow brighter, or at least psychovisually coordinate the colorimetry and especially the luminance relation of those two subregions). So subclasses of the fireball regime could e.g. be "Fire_Hardly_Covered" for 100-80% coverage, "Fire_Partly_Covered" for 79-40% coverage, and "Fire_Largely_Covered" for 39-10% coverage with dark subregions. With such additional regime characterizing information (spatial properties, texture properties, object classes, artistic intent, etc.) the different displays or apparatuses using the coded image can better tune their final rendering or transformations therefore. Also, the regimes can be used to map to smartly allocated luminance subranges of different displays (e.g. several "lights" and "whites", several "darks", several characteristic/control "greys", etc.). E.g., take the rendering of a scene on two HDR displays, an intermediate, near future one with a white luminance of 1500 nit, a higher quality HDR display of 4000 nit white, and a default "LDR/standard" display of 500 nit white. One can see these displays as upgrades, in that there exists an additional "effect/boost" luminance range(s) above the capabilities of the lesser quality one. Naively, one could blindly boost all bright areas, e.g. the abovementioned fireball, or a light like the sun, or a street light. Whereas the effect may be powerful, but still acceptable on the 1500 nit display, on the 4000 nit display this region rendering could have too excessive a brightness. Therefore, one could use the high end of the luminance range of the 4000 nit display for other kinds of light source renderings (e.g. laser beams fired), and constrain the fireballs to a subrange of lesser luminance. In the 500 nit display gamut, there is no room for all these different types of light regimes, so they are all rendered in the same subrange at the high luminance end of its gamut. The regime coding could give further specifics on how to render on the different kinds of display, e.g. instruct to simulate a different luminance with other light properties, e.g. make the light slightly more yellowish or bluish.

Figure 5:
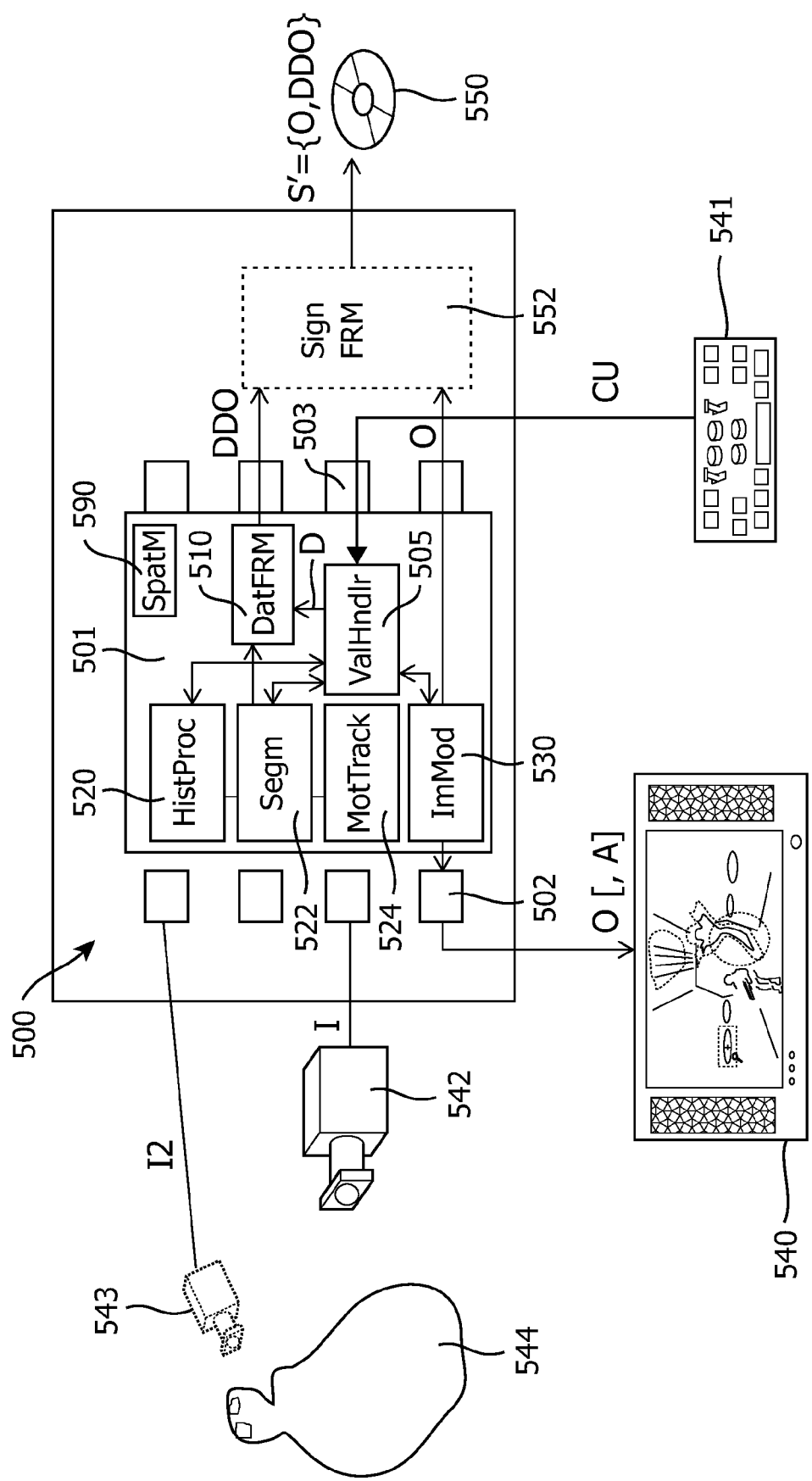
FIG. 5 schematically illustrates another environment with apparatuses and subunits allowing the creation and inspection of regime specifications.

FIG. 5 shows an example of an image analysis apparatus 500 for allowing the user (color grader, colorist, director of photography, (computer graphics) artist, etc.) to create the color regime specifications. It may be a dedicated color grading apparatus, or the image processing unit 501 may also be the generic processor (GPU) of a normal computer running color grading and regime creation software. Typically the image processing unit 501 will have a large set of image analysis units (or software tools, or plugins, e.g. edge detectors, texture characterizers, human person identifiers, etc.) allowing intelligent pre-analysis of the input image, allowing creation of quick user interaction widgets (e.g. reshapable spline contours) so that the artist has to spend minimal effort defining the regimes, their meaning, perhaps some linguistic explanation (which may e.g. be used if the movie is to be remastered later, by knowing the artist's intent), and what the receiving display should do. The output image O to be sent to the receiving display may just be a copy of the input image I from a main camera 542, but may also have been modified (e.g. by applying tone reproduction modification curves to selected regions) by an image modification unit 530, in which case the resulting image is what the artist would want to see on his calibration display 540. In contrast to the FIG. 3 example, a postproduction color grader may typically have a complex control panel 541 as user interaction means. A data handler 505 will take user input like e.g. clicks on a button to move a cursor and convert it into usable descriptive data D, such as selected regional template colors. It will communicate with the other modules, e.g. the histogram processor 520, which can then e.g. if a new rectangle is selected recalculate the histograms of all pixels inside, map a set of Gaussians to the data, etc. So the data handler 505 is typically arranged to perform all user interface interaction, both showing the results from image analysis to the user in an understandable (e.g. emphasizing or pre-presenting special regions by automatic image analysis of the image properties, not only luminance based but also content recognition based in more advanced embodiments) way (e.g. preshowing regions and their multimodal content by pseudocoloring the geometry of the captured image, or pseudocoloring property representations—such as histograms, or classification property graphs such as a two-dimensional chart e.g. showing the extent of the region in numerical texture properties—), but also in a way that allows easy interaction with those (e.g. showing what extra pixels are selected or how they get a different colorometric look, if the user manipulates the histogram, and feedbacking all user interaction (not only to extract regime parameters, but also to reprogram the image analysis algorithms, e.g. an image segmenter, based on the user's new semantic designation input regarding the content and structure of the image and how it should artistically look).

The spatial modification module 590 allows to do all kinds of spatial action, e.g. it may apply a parametric (tuned by the artist) reshadowing profile to a selected region.

Data encoder 510 formats the set of descriptive data D to a final output description data signal DDO, i.e. although complex coding transformations may be used, it may also simply copy the selected histogram/range/color properties parameters (e.g. a minimum and maximum luminance, multipliers for specifying the relationship of a first and a second luminance, e.g. determined by a mathematical formula for two sets of pixels, etc.), the selected spatial information (e.g. parameters for a linear chain encoding of a selected image region), processing algorithms (e.g. a mathematical tone reproduction curve to apply to the selected region pixels), etc. directly in the signal DDO.

Typically a signal formatter 552 will add the regime data containing signal DDO to the (potentially processed output) image signal data O, to create a final picture signal S', which may be stored on e.g. a bluray disk or other storage medium 550. But of course if the signal is directly transmitted/broadcasted (from a processing boot of a television studio, where colorimetric regime interference may be simple yet still occur nearly realtime), then the signal DDO may also be transmitted e.g. over a separate channel than the outputted images O, e.g. via the internet for a selective set of viewers, this being in-line with backwards compatibility (e.g. non paying customers may only get a lower color quality signal O, however paying customers may get the additional data DDO allowing them to get a much more perfect—artist intended rendering—on their high quality display; or similarly in a scalable scenario where several quality image streams are possible, a mobile viewer may select a lower priced lower bitrate stream, but also a regime set to allow him to create an optimal rendering). A second camera (or optical measurement device, e.g. spectrometric camera) 543 may be present for analyzing details of an object 544 (e.g. light-matter interaction properties, or further object properties). When capturing high dynamic scenes, on the one hand one may need an excessive amount of image codifying data, and on the other hand one may capture more of the scene than is desirable (e.g. blemishes of the décor may be captured, which the artist doesn't like to be rendered, or the rendering is not necessarily very critical/important, or not even possible on some displays e.g. in dark regions). The regimes can also be used to change the encodings or more complex colorimetric modification encodings of the underlying pixel images. E.g. a "bad" camera (e.g. in a pre-existing 60s movie) may have captured a dark shadowy region on a wall with little texture detail (mostly noise actually). However, on high quality displays, one may want/need to show some texture in that region. These last few bits may be added with a different encoding, e.g. a computer graphics pattern of wall blemishes may be encoded to be added in the last few bits of the underlying wall image (potentially also taking into account artist optimized denoising, which may be quantified in the DDO signal as either a mathematical denoising algorithm possibly with a residual profile, or a pixel value geometrical profile itself; the receiving display can then take this into account e.g. to tune its denoising or other image improvement algorithms), and this computer graphics or other encoding may be determined on actual measurements of the scene object by second camera/optical measurer 543, e.g. finely measuring fine textures, and fine changes in reflectance. The regime code "Shadow_1" can then immediately be linked to this additional data for the receiving display rendering. The data handler 505 may also provide the artist or any postoperator with a user interface to influence the final image encoding of the picture (and potentially additional data) such as e.g. how the scratches on the wall, or any structural encoding may be encoded to allow a certain look or looks at the receiving display end. Thereto the apparatus 500 is constructed so that the data handler can interact with the image modification unit 530, so that each respecification of the colorist (e.g. regarding importance of a dark regime, and its need to be more or less realistic/high quality/visually stunning/etc. rendered can directly be converted into a recoding of at least some regions of the output image O, and vice versa, any recodings (e.g. lowering the amount of bits for encoding a region, possibly putting some of the fine texture encoding in a second encoding) can via the data handler and the other image analysis modules (some of which may e.g. model typical display rendering characteristics) be shown to the artist as the output image with annotations A (e.g. spatial overlays of the regimes on the image O, which may be toggled away, to show the actual colorimetric look for different modeled typical receiving displays).

Figure 6:
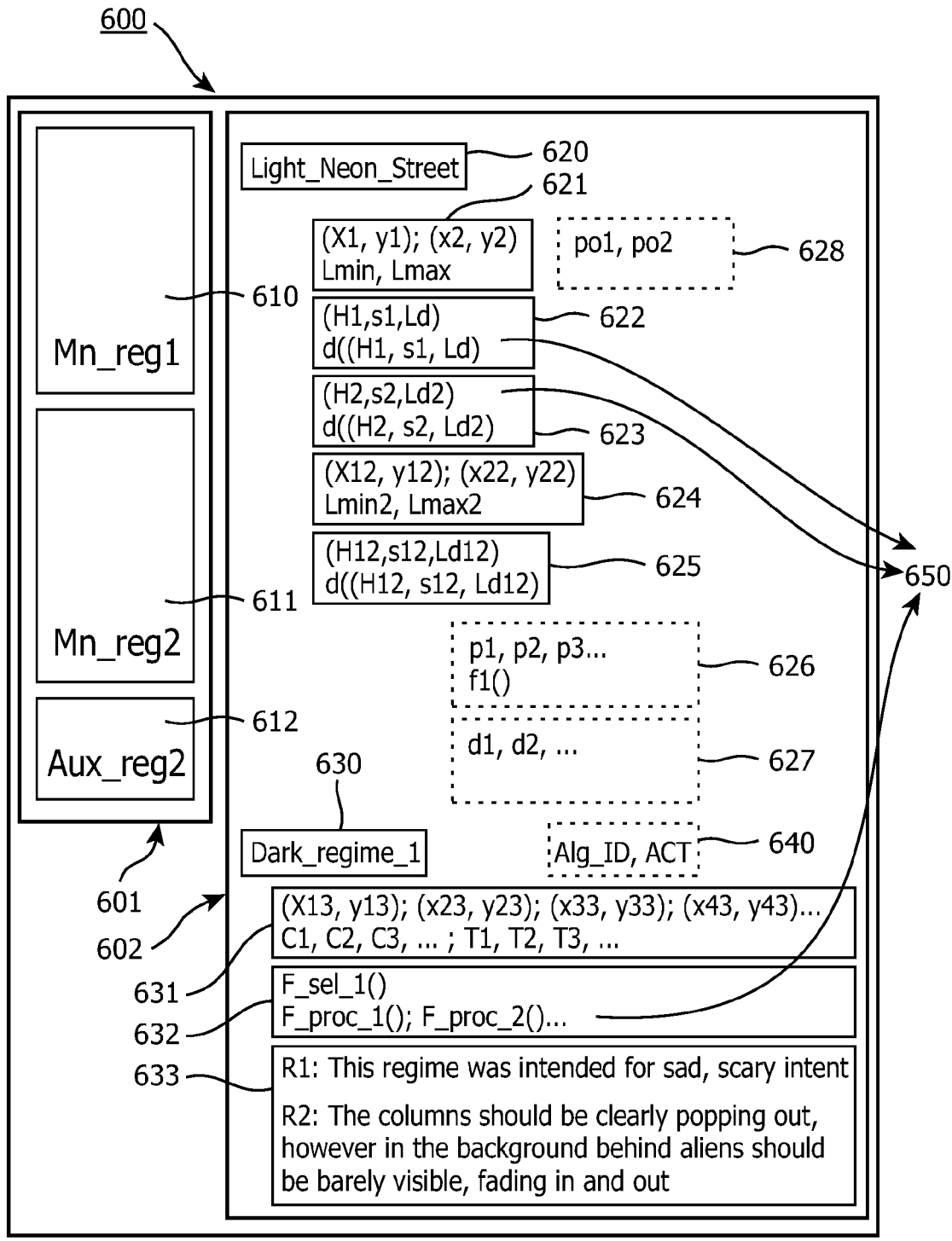
FIG. 6 schematically illustrates an image signal that can be used to communicate the rendering desires from the creation to the display side by means of color regime specifications.

FIG. 6 schematically shows a possible example of how an image/video signal (e.g. compressed according to an MPEG standard like MPEG4.10 (AVC) or VC1, etc. . . . ) may be improved with color rendering regime descriptions. The skilled person can imagine how this can be transmitted e.g. over wireless or wired communication networks, so we will describe the example in the light of storing on a memory medium (e.g. an optical disk, harddisk, detachable memory card from a (consumer) video camera, etc.). Typically the captured video itself (whether raw captured, or converted, e.g. with tone reproduction curves) is stored as (e.g. blocks of pixel values DCT transformed) image signal 610 for a first region of at least one image, image signal 611 for a second image region (which may be an overlay, e.g. a bottom ticker tape, but also the lighter regions of the image, if the first part only encodes captured pixel luminances below an upper value LCmax), and there may be an auxiliary signal 612 (e.g. for updating a region (e.g. of higher interest) with higher precision bits).

In the added regime specification (which may be written e.g. as disk management data on a reserved set of tracks on a disk) there is at least one (first) regime 620 specified (e.g. for the neon lights in the current shot or scene of images) together with its describing data (what it's properties are in the inputted image on the receiving side O, and what to do with it, color rendering wise, but also e.g. sharpness processing may have an impact on the color look).

In a simple signal example, there may be first region identification information 621, which may e.g. be the rectangle surrounding a first neon light (with upperleft and lowerright coordinates (x1,y1) and (x2,y2)) but also information enabling selecting a range of luminances (Lmin, Lmax), e.g. to further select only the slanted stripe of the neonlamp in the rectangle. One could also directly link with linking data 628 to parts in the encoded video, e.g. by using pointers po1, po2 to the start and end of a set of DCT blocks. One could have such a rectangle for each of the successive images in the shot, which allows tracking moving objects explicitly. More complex encodings may contain a selection algorithm to F_sel_1( ) to select the region in one or more successive images (which may involve picture analysis such as region growing, snakes fitting, motion tracking with coded motion parameters, etc.). Secondly, there are first regime rendering parameters 622. These may in a simple variant comprise a desired average hue H1 and saturation s1 (and typically also luminance or lightness Ld), characterizing the light, and there may be further specifications on allowed deviations d(H1,s1,Ld) which may be e.g. spatial deviations, deviations per rendering display, to take into account the viewing room environment etc.

Alternatively, complex models can be encoded to what the display should preferably, or always do taking into account various parameters, e.g. maximum achievable brightness of the receiving display, consumer preference settings (e.g. the consumer may prefer very dark rendering of a horror movie, and then the "shadow regimes" may be emphasized and rendered differently, but also the non-shadow remaining parts of the image may be darkened, or he may desire to brighten the shadow regimes to make it less scary [e.g. the moment or gradualness by which the monster in the corridor becomes visible, e.g. keep it visible out of sync with the scary music]) etc. Second regime rendering parameters 623 can be used to render the first neon light in a different way, e.g. on a different display or with different settings. Versatilely allowing coding of different parts of the image under the same regime, by allowing second region identification information 624 and third regime rendering parameters 625 allows e.g. to do something different with a red and a green neon light, however still retaining some coordination (e.g. their chromaticities or spatial profile may be handled differently, but they may be rendered at a similar perceived brightness).

Furthermore, there may be rendering tuning data 626 encoded, such as parameters p1, p2, p3, . . . for tunable algorithms like a saturation increaser, or even processing functions f1( ).

Also, there may be additional improvement data 627 d1, d2, . . . encoded to improve an decoded image region, e.g. by adding a graphics pattern (or any other additional encoding to add to the decoded local picture) as in the black wall example above, or doing some filtering changing the look, e.g. dedicated artifact processing etc. There may be a second regime 630 specified for the same image(s), e.g. how to handle the darker regions. This may again be done by adding third region identification information 631, e.g. a chain code or control points for a spline or other parametrized contour code (x13, y13), [other geometrical specifications can be used, e.g. covering with hierarchies of rectangles, etc.] . . . , characteristic property data of the region of pixels in the image O corresponding to the mentioned regime (e.g. colors C1, C2, . . . which may correspond to particular colors such as predominantly occurring colors, or histogram modes, or texture values T1, . . . which may e.g. be used as seeds or aid otherwise in a segmentation which can be done at the receiving side, to extract the region to be rendered in a prescribed way. Furthermore, there may be regime specification functions 632, both for extracting a particular region F_sel_1( ), and for processing it, e.g. for rendering it on a main display (F_proc_1( )), or derive from it a rendering for an auxiliary display (F_proc_2( )). The parameters relating to average intended color and deviations (622, 623), bounding functions, goal functions, processing functions (F_proc_1( )), etc. are all exampled of rendering specification data 650. Depending on how tight the algorithmic identity of the sending and receiving side is coordinated, algorithmic identification codes 640 may be comprised, e.g. stating with an identifier Alg_ID which receiver side algorithms or type of algorithms are involved and how—via action identifier ACT—they should coordinate their action for intended rendering (e.g. this may be as simple as the artist requesting that denoising should be switched off for a certain regime, or be applied to a certain strength; of course it is easier if e.g. a bluray player is arranged to correspond to what the new generation of disks desire, and handle all processing, but it may be preferable to still control something regarding the additional display processing then). Also there may be a description field 633, allowing the artist to specify what his intent was in rendering the regime ("it should look dark, and uninviting"), how this can actually be realized pshychovisually mathematically on the underlying image scene elements ("the columns should be conspicuously visible, yet the deeper parts of the cellar behind it should be rendered in a mysterious, difficult to discriminate way"), etc. This data descriptive can be used by a transcoder on a later occasion, or be relayed to the final viewer via the user interface as textual description of the artist's intentions. Of course more encodings could be added to this mere conceptual illustrative example.

Figure 7:
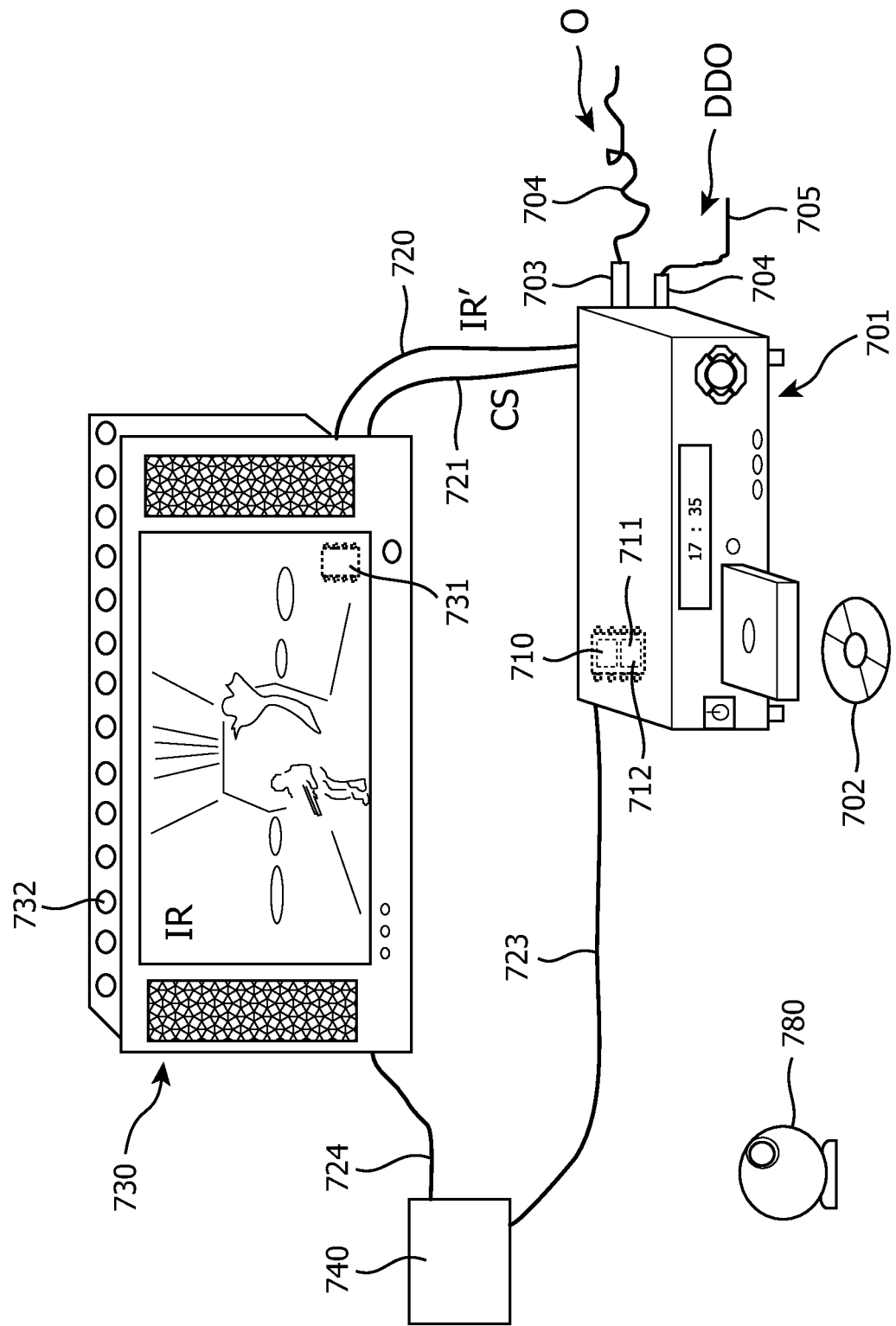

FIG. 7 shows an exemplary image decoding and displaying system at the receiving side, e.g. in a consumer's living room (the skilled person will understand how a similar system according to principles of our invention will look in e.g. a digital cinema theatre). An embodiment of color rendering image processing apparatus 701 is a settopbox with built-in bluray reader (but this may also be e.g. a laptop computer, or portable device like a mobile phone etc., i.e. the apparatus 701 can be as small as a plug-in card [as long as it is able to read the regime specifications, and allow color processing with it] or as big as a professional cinema transcoding studio) is able to receive a bluray 702 with the entire regime-annotated image signal encoded on it, i.e. both the image signal O, and the description data signal DDO containing the descriptions of different occurring regimes (e.g. for a few artistically critical shots, e.g. where night horror action occurs, or blasts of exploding space ships, or vividly colorful dream sequences etc.). Similarly however, the apparatus may have a first connection 703 to e.g. a television signal transmission cable (or antenna, or input for digital photos on a memory card, etc.; image signal may also variously mean e.g. a television standard encoded signal, or a raw image file etc.) 704 which carries the (typically compression encoded) input image O. The description data DDO may come over another medium via a second connector 704 e.g. connected to the internet 705 and a webpage providing an image improvement service. So DDO related to O means that, although they may typically be encoded on the same storage, or receivable via the same transmission, there just is some means to retrieve that additional data DDO, which however corresponds to at least some pixel region of some image of the input image signal O. The apparatus 701 has an IC which has at least an extractor 701 arranged to extract from DDO the regime encoding data, and either output it directly or convert it to new values more suitable for doing controlled image processing by an image processing unit 712. This may be embodied so simple as to only apply some tone reproduction transformations to the pixels corresponding to the special to be rendered regime, or have complex algorithms, e.g. typically corresponding to any of the algorithms that can be applied at the creation side, e.g. a segmentation and/or tracking algorithm/unit. The player 701 may output its improved intended rendering output image IR' to the display/television over a video cable 720 (e.g. HDMI), but since the television may do (or be requested to do) additional processing (on its image analysis and/or processing IC 731), a second connection (cable or wireless) 721 may be present for control signals CS (which may comprise any data from the signal DDO and/or control data derived therefrom). Typically these additional control signals may be added over the video cable, by updating e.g. the (wireless) HDMI protocol. The apparatus 723 may also send color signals over connection 723 to a second, environment color display 740, which may also obtain its intended rendering color input signals via the display 730. The exemplary display is with a LED backlight 732, ideal for HDR rendering. Environment measurement devices like measurement device 780 may be present, e.g. a cheap camera which can check the surround of the television, lights in the room, reflections on the television front plate, visibility of calibration grey scales, etc., and they may communicate this information to apparatus 701 and/or display 730, in fact they may generate an input for colorimetrically (luminance and/or chromaticity) controlling several apparatuses in a room, such as displays, lights, shutter glasses, etc.

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data traveling via a network connection—wired or wireless—, or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for

The invention claimed is:

1. A method of adding image defining information to an input image signal (I) representative of an original image, said method comprising:
   utilizing a display device to display the original image, as represented by the input image signal (I), to a reviewer;
   receiving from the reviewer descriptive data (D) including information locating at least one region of the original image that the reviewer visualizes differently than is displayed regime descriptor information (rd) defining an appearance, as visualized by the reviewer, of the at least one region of the original image; and
   encoding the descriptive data (D) into an output description data signal (DDO) in a technical format standardized for use by receiving display apparatus to effect rendering of an image representative of the original image and having an appearance of said at least one region that is representative of the appearance visualized by the reviewer.

2. A method as claimed in claim 1 and including receiving from the reviewer at least one of parameters and functions for effecting changing of color properties of the rendered image of the receiving display apparatus, and encoding said at least one of parameters and functions into the output description data signal (DDO).

3. A method as claimed in claim 1 and including enabling the reviewer to select a set of scene measurement data (Sm) derived from optical measurements of scene object optical properties obtained by measurement apparatus in a photographed scene.

4. A method as claimed in claim 1 where the descriptive data (D) from the reviewer includes specifications on how to map:
   at least one subset of at least one of luminance and chromaticity values of the original image (I); or
   at least one image sub region of the original image (I);
   to a sub range of color values that the receiving display apparatus is capable of reproducing.

5. A method as claimed in claim 4 where the sub range corresponds to a subset of pixels in the output image signal (O) to be displayed, said sub range being of a type comprising:
   pixel luminance values with an uppermost luminance equal to a maximum luminance; or
   pixel luminance values with a lowest luminance equal to a minimum luminance; or
   saturation values below a maximum saturation.

6. An image analysis apparatus for adding image defining information to input image signal (I) representative of an original image, said image analysis apparatus comprising:
   a display device for displaying the original image, as represented by the input image signal (I), to a reviewer;
   a data handler for receiving from the reviewer descriptive data (D) including information locating at least one region of the original image that the reviewer visualizes differently than is displayed and regime descriptor information (rd) defining an appearance, as visualized by the reviewer, of the at least one region of the original image; and
   a data encoder for encoding the descriptive data (D) into an output description data signal (DDO) in a technical format standardized for use by receiving display apparatus to effect rendering of an image representative of the original image and having an appearance of said at least one region that is representative of the appearance visualized by the reviewer.

7. An image analysis apparatus as claimed in claim 6 and comprising at least one of:
   a histogram analysis module adapted to generate histograms of subsets of pixels of an image;
   a segmentation module adapted to segment a region of pixels in an image on the basis of an image display criteria; and
   a motion tracker arranged to track an object displayed in consecutive images.

8. A method of processing an input image signal (O) representative of an input image to be rendered based on image defining information related to the input image signal (O), said method comprising:
   extracting descriptive data (D) specifying a color regime from an encoding (DDO) of the image defining information, the descriptive data (D) including at least one of luminance values and geometrical shape information, and further including a regime descriptor (rd);
   image processing the input image signal (O) to obtain an output image (IR) to be rendered based upon the regime descriptor (rd), and
   applying a tone reproduction curve mapping to a part of the input image corresponding to the regime descriptor (rd) by mapping input luminances of pixels of the part of the input image to output luminances of said pixels.

9. An apparatus for processing an input image signal (O) to be rendered based on image defining information related to the input image signal (O), said apparatus comprising:
   an extractor adapted to extract descriptive data (D) specifying a color regime from an encoding (DDO) of the image defining information, the descriptive data (D) including at least one of luminance values and geometrical shape information, and further including a regime descriptor (rd); and
   an image processing unit adapted to process the input image signal (O) to obtain an output image (IR') to be rendered, based upon the regime descriptor (rd) and to apply a tone reproduction curve mapping to a part of the input image corresponding to the regime descriptor (rd) by mapping input luminances of pixels of the part of the input image to output luminances of said pixels.

10. An apparatus as claimed in claim 9 where the image processing unit is adapted to apply a color transformation on at least the luminances of pixels in a part of the input image corresponding to the region descriptor (rd).

11. A method of processing an input signal including descriptive data (D) added by a reviewer of a display of an original image to a description data signal (DDO) representative of the original image, said method comprising:
   receiving the input signal;
   extracting front the input signal the descriptive data (D) added by the reviewer, said descriptive data (D) including information locating at least one region of the original image that the reviewer visualizes differently than is shown in said display of the original image and regime descriptor information (rd) defining an appearance, as visualized by the reviewer, of said at least one region of the original image; and processing the extracted descriptive data (D) and effecting rendering of an image representative of the original image and having an appearance of said at least one region that is representative of the appearance visualized by the reviewer.

12. An apparatus for processing an input signal including descriptive data (D) added by a reviewer of a display of an original image to a description data signal (DDO) representative of an original image, said apparatus comprising:

an extractor for extracting from the input signal the descriptive data (D) added by the reviewer, said descriptive data (D) including information locating at least one region of the original image that the reviewer visualizes differently than is shown in said display of the original image and regime descriptor information (rd) defining an appearance, as visualized by the reviewer, of said at least one region of the original image; and an image processing unit adapted to process the extracted descriptive data (D) and to effect rendering of an image representative of the original image and having an appearance of said at least one region that is representative of the appearance visualized by the reviewer.

* * * * *